No. 608,539. Patented Aug. 2, 1898.
F. BARTO.
BICYCLE STEADYING DEVICE.
(Application filed Apr. 7, 1897.)
(No Model.)
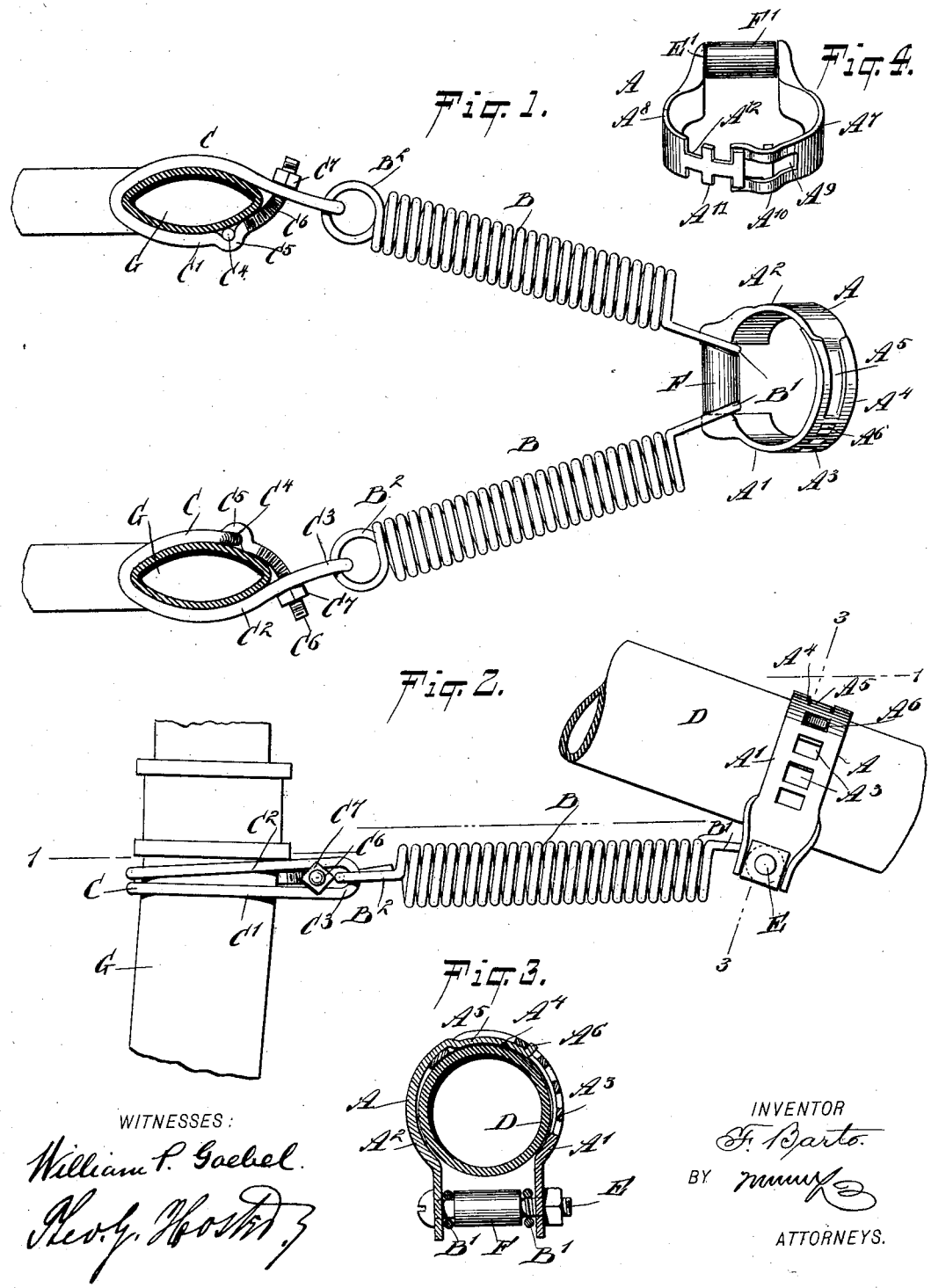
WITNESSES:
William P. Goebel.
INVENTOR
F. Barto.
BY
ATTORNEYS.

UNITED STATES PATENT OFFICE.

FRANK BARTO, OF NEW YORK, N. Y.

BICYCLE-STEADYING DEVICE.

SPECIFICATION forming part of Letters Patent No. 608,539, dated August 2, 1898.

Application filed April 7, 1897. Serial No. 631,121. (No model.)

*To all whom it may concern:*

Be it known that I, FRANK BARTO, of New York, (Brooklyn,) in the county of Kings and State of New York, have invented a new and Improved Bicycle-Steadying Device, of which the following is a full, clear, and exact description.

The object of the invention is to provide a new and improved bicycle-steadying device arranged for convenient attachment to the bicycle and adapted to hold the front or steering wheel normally in proper alinement with the rear or driving wheel and to allow the rider to turn the front wheel to the right or to the left and to return the said wheel to its alined position whenever the rider releases the pressure on the handle-bars after steering the machine in the proper direction.

The invention consists principally of clamps of special construction and secured to the members of the front fork, springs connected with the said clamps, and a clip held adjustably on the lower brace of the bicycle-frame and adapted to receive the rear ends of the said springs.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional plan view of the improvement as applied and on the line 1 1 of Fig. 2, with the upper brace omitted. Fig. 2 is a side elevation of the improvement as applied. Fig. 3 is a transverse section of the same on the line 3 3 of Fig. 2, and Fig. 4 is a perspective view of a modified form of clip.

The improved bicycle-steadying device consists principally of a clip A, the two springs B B, and the clips C C, as illustrated in the drawings. The rear ends B' of the springs B B are attached to a transversely-extending bolt E for fastening the free ends of the members A' and A² of the clip A together, so as to hold the said clip in proper position on the lower brace D of the bicycle-frame. Between the two ends B' of the springs is placed a collar F, of rubber or other elastic material, so as to hold the said ends apart, at the same time permitting of a slight yielding of the collar when the wheel is steered to the right or the left to prevent binding of the rear ends of the springs on the bolt E.

The clip A has its member A' formed with a series of apertures A³ and near its upper end with a slot A⁴, through which passes the tongue A⁵, projecting from the upper end of the member A², and formed at its extreme end with an upwardly-bent lip A⁶, adapted to engage one of the apertures A³, so as to permit of adjusting the clip to various-sized upper braces D, at the same time securely fastening or connecting the two members A' and A² with each other.

The clip A (shown in Fig. 4) has its two members A⁷ and A⁸ connected with each other at their lower ends by a bolt E', on which is held a collar F' similar to the collar F. The member A⁷ is formed near its upper end with a slot A⁹, the side walls of which are bent, as at A¹⁰, to receive the lugs A¹¹, projecting from the tongue A¹², formed on the upper end of the member A⁸. The tongue A¹² is adapted to pass into the slot A⁹, and its lugs A¹¹ are adapted to engage the side walls A¹⁰, according to the size of the upper brace D, to fit the clip snugly on the said brace. Each of the clamps C is preferably made of a piece of wire doubled up to form the two members C' and C², engaged at their doubled-up middle portion C³ by the forward end B² of the corresponding spring B. The two members C' and C² of the clamp are fashioned to fit upon the members G of the front fork, as plainly indicated in Fig. 1, and the upper member C² has its outer end bent vertically to form a lug C⁴, engaged by a hook C⁵, formed transversely in the other member C'. The extreme free end C⁶ of this member C' extends a suitable distance beyond the lug C⁴ of the member C², and this end is threaded and extends between the two members C' and C² at the doubled-up portion or slot formed by the two members, as plainly indicated in Fig. 2. A nut C⁷ screws on the threaded end C⁶ to securely draw the members tightly around the fork members G, so as to securely lock the clamp in place on the fork members.

Now it will be seen that by the arrangement described each clamp can be readily fitted upon members G of forks of different sizes, as the end C⁶ can readily slide in the slot formed by the two members C' and C² of the clamp, as will be readily understood by reference to Fig. 2.

When the device is applied on the bicycle, the clamps are securely fastened in place on the members of the front fork, and the clip A is adjusted longitudinally on the lower brace D, so as to stretch the springs B tightly from the clamps to the clip. Now it is evident that when the rider turns the front fork to steer the wheel to the right or left the spring B on the opposite side is expanded, and consequently when the rider releases the pressure on the handle-bar the said expanded spring will return by its own resiliency to its normal position and in doing so will pull on the corresponding member of the front fork to return the same to a normal position—that is, to bring the front wheel back into alinement with the rear or driving wheel.

By having the clamps and clip made in the manner described the same can be fitted to various-sized frames and securely fastened in place.

The manner of the connection or adjustment of the clamps with the springs allows a free pivotal movement of one part within the other, always insuring a direct pull or tension upon the springs.

The clip C, as well as the clamp A, may be used individually for other purposes than those herein mentioned.

Having thus fully described my invention, I claim as new and desire to secure by Letters Patent—

1. A device of the class described, provided with a clip formed of a single piece of metal bent upon itself to form at one end a connection for a spring, and having its other end threaded and engaging the doubled-up portion, and a nut screwing on the said threaded end and abutting against the doubled-up portion, substantially as shown and described.

2. A bicycle-steadying device, provided with a clip formed of a length of wire bent intermediately to produce a loop, one end of the wire being threaded and passed through the loop, and a nut working on said end of the wire, the threaded end of the wire having a hook formed therein which receives and holds the remaining end of the wire.

FRANK BARTO.

Witnesses:
   THEO. G. HOSTER,
   JNO. M. RITTER.